United States Patent
Liu et al.

(10) Patent No.: US 11,962,153 B2
(45) Date of Patent: Apr. 16, 2024

(54) ACTIVE DISTRIBUTION NETWORK PHYSICS-INFORMATION FUSION CONTROL METHOD FOR A HYBRID SYSTEM MODEL

(71) Applicant: Shanghai Jiaotong University, Shanghai (CN)

(72) Inventors: Dong Liu, Shanghai (CN); Fei Chen, Shanghai (CN); Jiaming Weng, Shanghai (CN)

(73) Assignee: Shanghai Jiaotong University, Shanghai (CN)

( * ) Notice: Subject to any disclaimer, the term of this patent is extended or adjusted under 35 U.S.C. 154(b) by 373 days.

(21) Appl. No.: 17/492,704

(22) Filed: Oct. 4, 2021

(65) Prior Publication Data
US 2022/0352718 A1    Nov. 3, 2022

(30) Foreign Application Priority Data
Apr. 25, 2021  (CN) .......................... 202110449003.3

(51) Int. Cl.
*H02J 3/14*      (2006.01)
*H02J 3/00*      (2006.01)

(52) U.S. Cl.
CPC .............. *H02J 3/144* (2020.01); *H02J 3/003* (2020.01); *H02J 3/004* (2020.01)

(58) Field of Classification Search
CPC .. H02J 3/144; H02J 3/003; H02J 3/004; H02J 2203/10; H02J 2203/20; H02J 3/06; Y02E 60/00; G06Q 10/06
See application file for complete search history.

(56) References Cited

U.S. PATENT DOCUMENTS

2016/0179118 A1*  6/2016  Song .................... H02J 3/14
                                                    700/295
2016/0276830 A1*  9/2016  Nasirian ............... G05B 15/02

FOREIGN PATENT DOCUMENTS

CN        104124700 A    * 10/2014
CN        111276962 A    *  7/2020

* cited by examiner

*Primary Examiner* — Kidest Bahta
(74) *Attorney, Agent, or Firm* — IDEA Intellectual Limited; Margaret A. Burke; Sam T. Yip

(57) ABSTRACT

The present invention provides an active distribution network physics-information fusion control method for a hybrid system model includes an initialization time being a starting time, predicting power output and load of a feeder intermittent distributed power supply within a control time period T, calculating a feeder exchange power deviation variation ΔP(t) during the control time period, if being a fixed distribution coefficient, and establishing a hybrid system model for feeder power coordinated control; if being a rolling distribution coefficient, an exchange power P(t) of the control region at time t being obtained, generating a distribution coefficient matrix W(t), and establishing the hybrid system model of the said feeder power coordinated control; confirming a control objective function min J, converting it into a MIQP, obtaining a full period control quantity; selecting a first control quantity P of the optimized control sequence, sending the first control quantity P to the control device.

10 Claims, 4 Drawing Sheets

ACTIVE DISTRIBUTION NETWORK PHYSICS-INFORMATION FUSION CONTROL METHOD FOR A HYBRID SYSTEM MODEL

CROSS-REFERENCES TO RELATED APPLICATIONS

This application is claiming priority from a Chinese patent application number 202110449003.3 filed on Apr. 25, 2021, the disclosure of which are incorporated herein by reference in their entirety.

FIELD OF THE INVENTION

The present invention relates to the technical field of intelligent power distribution networks, and in particular to an active distribution network physics-information fusion control method for a hybrid system model.

BACKGROUND OF THE INVENTION

In the coordinated operation of the primary system and the information control system, the active distribution network includes physical processes and information processes. It has the basis for the realization of physics-information fusion, which is a typical application scenario of physical information systems. From the control method and the existing three-level hierarchical distributed control system, the active distribution network has the following characteristics. 1) In the active distribution network, the information control system composed of controllers at all levels and the communication network, and the physical system composed of the primary equipment of the active distribution network is a heterogeneous system with interaction and coordination; 2) The information control system has an effect on the primary system through the control quantity, and adopts the digital discrete working mode to make the continuous operation of the primary system discontinuous, which is the fusion of discrete control and continuous dynamic process; 3) There are two-way information interactions between the controllers at all levels of the active distribution network information control system, between the controller and the primary equipment, and between the controller and the energy management system, that is, the fusion of the information integration system and the primary system.

The current active power distribution network has not yet achieved physics-information closed fusion. Although ADN has been able to realize the control function of the primary system with the assistance of the information control system. However, the primary system and the information control system are still in a relatively isolated state. No matter the analysis and control of the information system or the physical system, the interaction between the two systems is not be considered. At the same time, as far as the primary system is concerned, the main goal is to initially realize the control function, and the real-time control level still uses the traditional PI differential adjustment without introducing advanced control methods. In addition, in information integration, multiple information models coexist, but no flexible model transformation is formed.

SUMMARY OF THE INVENTION

This section is for the purpose of summarizing some aspects of embodiments of the invention and to briefly introduce some preferred embodiments. In this section, as well as in the abstract and the title of the invention of this application, simplifications or omissions may be made to avoid obscuring the purpose of the section, the abstract and the title, and such simplifications or omissions are not intended to limit the scope of the invention.

In view of the above-mentioned existing problems, the present invention is proposed.

Therefore, the present invention provides an active distribution network information physics-fusion control method for a hybrid system model, which can solve the problems of single control state, lagging control effect and lack of optimal control in common control methods.

In order to solve the above technical problems, the present invention provides the following technical solutions includes, an initialization time being a starting time Time=t, predicting power output and load of a feeder intermittent distributed power supply within a control time period T, calculating a feeder exchange power deviation variation $\Delta P(t)$ during the control time period, selecting a power distribution mode: if being a fixed distribution coefficient, generating a distribution coefficient matrix W, and establishing a hybrid system model for feeder power coordinated control; if being a rolling distribution coefficient, an exchange power P(t) of the control region at time t being obtained, generating a distribution coefficient matrix W(t), and establishing the hybrid system model of the said feeder power coordinated control; confirming a control objective function min J, converting it into a MIQP problem and solving thereof, then obtaining a full period control quantity; selecting a first control quantity P of the optimized control sequence, sending the first control quantity P to the control device, and judging whether the current time is end time, Time=end?, if so, it ends; if not, performing an optimal control on a subsequent time period, Time=t+$\Delta$t, recalculating the feeder exchange power deviation variation $\Delta P(t)$ in the control time period, until the end time, Time=end?, is met.

As a preferred solution of the active distribution network physics-information fusion control method for a hybrid system model, the feeder exchange power deviation variation $\Delta P(t)$ during the control period includes, for a power fluctuation of the feeder f at time t+$\Delta$t, $\Delta$t being a time interval, resulting in a deviation $\Delta P_f(t+\Delta t)$ between an exchange power value $P_f^{real}(t+\Delta t)$ and an optimal value $P_f^{opt}(t_+\Delta t)$ of the feeder, wherein a feeder exchange power value $P_f^{real}(t+\Delta t)$ is obtained by the time value at a collection point t+$\Delta$t of a metering device installed at the feeder outlet, wherein the optimal value is obtained by a master station optimization, and relative to the state at time t, the feeder exchange power deviation variation in the control time period is $\Delta P(t) = \Delta P_f(t+\Delta t) - \Delta P_f(t)$, wherein the power change of $\Delta P(t)$ occurs on the feeder in the time interval of $\Delta$t.

As a preferred solution of the active distribution network physics-information fusion control method for a hybrid system model, taking the control region as a control object in the power distribution, and eliminating the variation of the feeder exchange power deviation during the control period; all controllable distributed power sources between the branch defining switches on the feeder or between the branch defining switches and the end of the line forming a control region; a distribution coefficient matrix W being a constant matrix, as follows, $$W = [K_1, K_2 \cdots K_m \cdots K_i]$$

$$\begin{bmatrix} -1 & -1 & \cdots & -1 \\ 1 & 1 & \cdots & 1 \\ -\Delta P(t) & -\Delta P(t) & \cdots & 0 \\ \Delta P(t) & 0 & \cdots & \Delta P(t) \\ & 0_n & & \\ & 0_n & & \end{bmatrix} \delta(t) \leq \begin{bmatrix} 0 & 0 & \cdots & 0 \\ 0 & 0 & \cdots & 0 \\ 0 & 0 & \cdots & 0 \\ 0 & 0 & \cdots & 0 \\ & -I_n & \\ & I_n & \end{bmatrix} x(t) + \begin{bmatrix} -1 \\ 1 \\ 0 \\ 0 \\ P_{max} \\ -P_{min} \end{bmatrix}$$

$K_1, K_2 \ldots K_m \ldots K_i$ represent vectors, where $K_m$ represents a distributed power in the control region according to $m^{th}$ coefficient combination, which is number of possible combinations, and only be one combination at any time; i is calculated by $i=1+m''+j''$, where n is the number of control regions included in the feeder; j is the number of possible values included in the distribution coefficient of each control region; $0_n$ represents an n-dimensional order zero matrix; $I_n$ represents an n-dimensional unit matrix; $P_{max}$ represents a maximum adjustable power of the distributed power in the control region; $P_{min}$ represents a minimum adjustable power of the distributed power in the control region; and $\delta(t)$ is a logic vector, $\delta(t)=[(\delta_1(t), \delta_2(t) \ldots \delta_m(t) \ldots \delta_i(t)]'$, satisfying $\delta_m(t) \in \{0,1\}$, $m \in [1,2,3 \ldots i]$, where definitions of m and i are the same as the foregoing definition, and at any time, there is only one way to distribute power in the control region, so only one element in $\delta(t)$ takes 1, to satisfy the inequality constraint $$\begin{cases} \overbrace{[1, 1, 1 \ldots 1]}^{1 \times i} \times \delta(t) \geq 1 \\ \overbrace{[1, 1, 1 \ldots 1]}^{1 \times i} \times \delta(t) \leq 1, \end{cases}$$

wherein the definition of i is the same as before, x(t) is a power distribution coefficient to be solved.

As a preferred solution of the active distribution network physics-information fusion control method for a hybrid system model, the $m^{th}$ coefficient combination distributing a power $K_m$; within any time t, when the region distributing power according to the $m^{th}$ coefficient combination $K_m$, the corresponding logical variable being set to 1, thus $\delta_m(t)=1 \Leftrightarrow K(t)=K_m$, wherein $\Leftrightarrow$ is an equivalent symbol; K(t) represents the distribution coefficient vector within any time t, such that $K_n(t)$ combinations of the distribution coefficients of the n control regions is $K(t)=[K_1(t), K_2(t) \ldots K_n(t)]'$; for control region n, having $K_n(t) \in K = \{K_{n1}^0, K_{n1}^+, K_{n2}^+ \ldots K_{nm}^+, K_{n1}^- K_{n2}^- \ldots K_{nj}^-\}$, wherein j is the same as the preceding definition; $K_{n1}^0$, represents a first scenario that a first distribution coefficient of the control region n is zero, meaning that the region does not participate in adjustment; $K_{n1}^+$ represents a second scenario that the first distribution coefficient of region n is used to balance $\Delta P(t) \geq 0$; and $K_{n1}^-$ represents a third scenario that the first distribution coefficient of region n is used to balance $\Delta P(t) \leq 0$; when the distribution coefficient vector K(t) comprising all of the three scenarios, all the control regions associated therewith do not participate in power regulation, in which case the distribution coefficient vector is recorded as $K^0(t)$; if $\Delta P(t) \leq 0$ occurs on the feeder at time t, all the control regions increase the power of the output to the feeder, and the distribution coefficient vector is recorded as $K^+(t)$; if $\Delta P(t) \leq 0$ occurs on the feeder at time t, all the control regions reduce the power input into the feeder, and at this time, and the distribution coefficient vector is recorded as $K^-(t)$.

As a preferred solution of the active distribution network physics-information fusion control method for a hybrid system model, dividing the logical vector $\delta(t)$ into three parts: $\delta(t)=(t)[\delta^0(t), \delta^+(t), \delta^-(t)]'$, corresponding to the $K^0(t)$, $K^+(t)$ and $K^-(t)$, and satisfying the following distribution coefficient selection rules, $$\Delta P(t) \cdot [\delta^0(t) + \sum \delta^+(t)] \geq 0 \Leftrightarrow \Delta P(t) \cdot [1, \overline{1,1,1\cdots 1}^{+}, \overline{0,0,0\cdots 0}^{-}] \cdot \delta(t) \geq 0$$

$$\Delta P(t) \cdot [\delta^0(t) + \sum \delta^-(t)] \leq 0 \Leftrightarrow \Delta P(t) \cdot [1, \overline{0,0,0\cdots 0}^{+}, \overline{1,1,1\cdots 1}^{-}] \cdot \delta(t) \leq 0$$

when $\Delta P(t) > 0$, each of the control regions can only select the distribution coefficient in the $K^+(t)$ at the same time; when $\Delta P(t) < 0$, each of the control regions can only select the distribution coefficient in the $K^-(t)$ the same time; when $\Delta P(t)=0$, $K^0(t)$ is selected, + represents a corresponding section in item $\delta^+(t)$ to that in $\delta(t)$; and − represents a corresponding section in item $\delta^-(t)$ to that in $\delta(t)$.

As a preferred solution of the active distribution network physics-information fusion control method for a hybrid system model, the control region exchange power P(t) being an n-dimensional vector composed of the control region exchange powers of n control regions, satisfying $P(t)=[P_1(t), P_2(t) \ldots P_n(t)]'$, where $P_1(t)$ is an exchange power value of the control region 1; the distribution coefficient matrix being W(t), $W(t)=[K_1', K_2' \ldots K_m' \ldots K_i']$; wherein the $m^{th}$ coefficient combination distributed power $K_m'$ is satisfied, at any time t, when the control region distributes power according to the $m^{th}$ coefficient combination $K_m'$, the distribution coefficient vector $K'(t)=K_m'$; when the distribution coefficient vector K'(t) comprising the three scenarios, all the control regions do not participate in power regulation, in which case the distribution coefficient vector is recorded as $K^+(t)$; when $\Delta P(t) \leq 0$ occurs on the feeder at time t, all the control regions increase power output to the feeder, and the distribution coefficient vector is recorded as $K^+(t)$; when $\Delta P(t) \leq 0$ occurs on the feeder at time t, all the control regions reduce the power input into the feeder, and the distribution coefficient vector is recorded as $K^-(t)$;

$$K^{+\prime}(t) = \frac{1}{\sum_{i=1}^{n} P_{i-max} - \sum_{i=1}^{n} P_i(t)} \cdot [P_{1-max} - P_1(t), P_{2-max} - P_2(t) \cdots P_{n-max} - P_n(t)]$$

$$K^{-\prime}(t) = \frac{1}{\sum_{i=1}^{n} P_i(t)} \cdot [P_1(t), P_2(t) \cdots P_n(t)]$$

$P_{i-max}$ represents an upper limit of power adjustment for the $i^{th}$ control region.

As a preferred solution of the active distribution network physics-information fusion control method for a hybrid system model, the hybrid system model for feeder power coordinated control includes, constructing an FSM model for an active distribution network feeder power control, and based on the FSM model, constructing an MLD model for an active distribution network feeder power coordinated control represented by a quintuple as follows:

$$A=\{Q,F,G,E,I\}$$

Q represents a limited set of states of the modeling object, which is the discrete state feature of the modeling object; F is a set of physical motion principles of the modeling object at each state, which describes the continuous dynamic characteristics of the modeling object, and when expressed by differential equations, a combination of Q and F being expressed as follows:

$$P(t+\Delta t)=I_n P(t)+K(t)\cdot \Delta P(t)$$

G is a set of trigger events, which is composed of a series of events that cause the state transition or stagnation of the modeling object; E is a set of transfer functions, representing mapping rules for variables and states to be satisfied when a state transition occurs for the modeling object, where the state transition depends on the selection of the distribution coefficient vector K(t) by the control region; I represents the initial state set, which sets the initial state of the modeling object; adopting a progressive distribution mode to the hybrid system model by accumulating variation $\Delta P(t)$ of deviation at each time to reflect the progressive relationship between two of the time points in the control region.

As a preferred solution of the active distribution network physics-information fusion control method for a hybrid system model, the MLD model includes if the power distribution mode is a fixed distribution coefficient, the distributed power is expressed as follows:

$$P(t+\Delta t)=I_n\cdot P(t)+W\cdot \delta(t)\cdot \Delta P(t)$$

If the power distribution mode is a rolling distribution coefficient, the distributed power is expressed as follows:

$$P(t+\Delta t)=I_n\cdot P(t)+W(t)\cdot \delta(t)\cdot \Delta P(t)$$

As a preferred solution of the active distribution network physics-information fusion control method for a hybrid system model, the control objective function comprises reducing a feeder power deviation, reducing cost of power regulation in the control region, and maintaining the region power exchange target; the MIQP problem comprises variations of the power of the n control regions on the active distribution network feeder according to the feeder exchange power, adjusting the exchange power in the power region according to the FSM model of the active distribution network feeder power control, when the MLD model constraint condition of the active distribution network feeder power coordinated control is satisfied, all the power distribution coefficients in the control period T are calculated to optimize the control objective function.

As a preferred solution of the active distribution network physics-information fusion control method for a hybrid system model, a first control variable P of the optimized control sequence representing the power exchange of each control region calculated according to the first power distribution coefficient vector in the control period T; a control device is arranged in the control region, and the distributed power supply in the control region is controlled according to the exchange power of the control region; $\Delta t$ is a desired optimization step size.

The beneficial effects of the present invention: the present invention introduces multiple switching states of the feeder power distribution coefficient into the control process, so that the distribution method and the distribution process are more reasonable. Considering the operation state switching and scene evolution during the control process, and providing conditions for further optimization; The use of predictive information and predictive control improves the hysteresis of PI control, and can comprehensively consider the overall effect of the current control period in one round of control;

Introducing the optimization process into feeder power distribution can support the optimization of feeder distribution coefficients from multiple perspectives such as feeder power error, reducing adjustment costs, and maintaining the target value of regional exchange power.

BRIEF DESCRIPTION OF THE DRAWINGS

In order to explain the technical solutions of the embodiments of the present invention more clearly, the following will briefly introduce the drawings used in the description of the embodiments. Obviously, the drawings in the following description are only some embodiments of the present invention. For those of ordinary skill in the art, other drawings can be obtained from these drawings without creative labor. Wherein.

DETAILED DESCRIPTION

Figure 1:
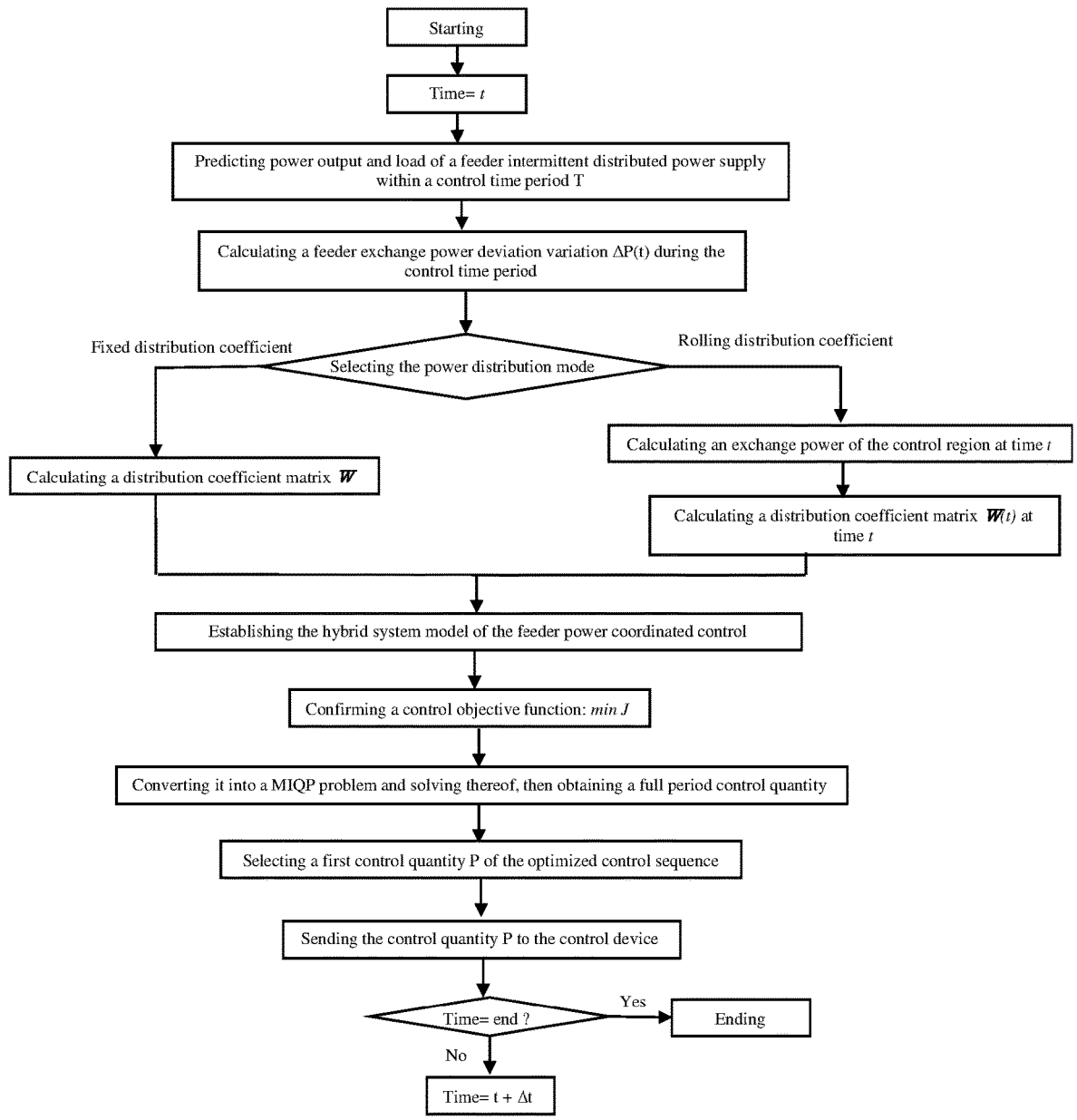
FIG. 1 is a schematic flowchart of the active distribution network physics-information fusion control method for a hybrid system model according to an embodiment of the present invention.

In order to make the above objectives, features, and advantages of the present invention more obvious and understandable, the specific embodiments of the present invention will be described in detail below in conjunction with the accompanying drawings of the specification. Obviously, the described embodiments are part of the embodiments of the present invention, but not all of the embodiments. Based on the embodiments of the present invention, all other embodiments obtained by those of ordinary skill in the art without creative work should fall within the protection scope of the present invention.

In the following description, many specific details are explained in order to fully understand the present invention, but the present invention can also be implemented in other ways different from those described here. Those skilled in the art can make similar promotion without violating the connotation of the present invention. Therefore, the present invention is not limited by the specific embodiments disclosed below.

Secondly, the "one embodiment" or "embodiment" referred to herein refers to a specific feature, structure, or characteristic that can be included in at least one implementation of the present invention. The appearances of "in one embodiment" in different places in this specification do not all refer to the same embodiment, nor are they separate or selectively mutually exclusive embodiments with other embodiments.

The present invention will be described in detail in conjunction with schematic diagrams. When the embodiments of the present invention are described in detail, for ease of description, the cross-sectional view showing the device structure will not be partially enlarged according to the general scale. Moreover, the schematic diagram is only an example, which should not limit the scope of protection of the present invention here. In addition, the three-dimensional dimensions of length, width and depth should be included in the actual production.

At the same time, in the description of the present invention, it should be noted that the orientation or positional relationship indicated by "up, down, inside, and outside" in the terms is based on the orientation or positional relationship shown in the drawings. It is only for the convenience of describing the present invention and simplifying the description, rather than indicating or implying that the device or element referred to must have a specific orientation, be constructed and operated in a specific orientation, and therefore cannot be understood as a limitation of the present invention. In addition, the terms "first, second, or third" are only used for descriptive purposes, and cannot be understood as indicating or implying relative importance.

Unless otherwise clearly specified and limited in the present invention, the term "installation, connection, conjunction" should be understood in a broad sense, for example: it can be a fixed connection, a detachable connection or an integral connection; it can also be a mechanical connection, an electrical connection or a direct connection. The connection can also be indirectly connected through an intermediate medium, or it can be the internal communication between two components. For those of ordinary skill in the art, the specific meanings of the above-mentioned terms in the present invention can be understood in specific situations.

Example 1

The active distribution network can realize the management of the feeder power in the network and the power of the autonomous control region through the coordinated control of the active output of the distributed power supply. On the basis of long-term global optimization calculations, due to feeder load changes, intermittent energy fluctuations and other reasons, there is a power deviation between the feeder and the upper-level system's real-time power exchange (referred to as feeder exchange power) and the optimization target. The active distribution network will distribute the power deviation to the distributed power sources participating in the control on the feeder according to a certain distribution coefficient. In this way, the utilization rate of distributed power in the feeder is fully improved, and it is also conducive to the exchange of power between the feeder and the outside world, and the power of the main nodes in the feeder can be maintained as close to the target value as possible.

However, the current common control methods have three shortcomings:

(a) The control state is single; the power distribution coefficient of each control region is a constant value, which is generally selected according to the total backup capacity of the distributed power participating in the control of the distributed power source at the beginning of the region control, without considering the influence of the feeder and the operating state of the distributed power source.

(b) The control effect is lagging; the control output will always deviate from the optimal value in a short time when the feeder exchange power fluctuation occurs, or there is a large overshoot that affects the normal use of the distributed power supply, or it oscillates and can only operate near the optimal value.

(c) Lack of optimal control; although there has been a long-term global optimization before PI control, there is no short-time-scale optimal control of the state changes that occur during the control process. For example, when regions change their contribution to controlling distributed power in order to bear feed power deviations, there will also be changes in exchange power between regions. This may result in a large deviation between the regional exchange power and the optimal value.

According to FIG. 1, which is the first embodiment of the present invention, provides the active distribution network physics-information fusion control method for a hybrid system model, S1: An initialization time being a starting time Time=t.

S2: Predicting power output and load of a feeder intermittent distributed power supply within a control time period T.

S3: Calculating a feeder exchange power deviation variation $\Delta P(t)$ during the control time period S4: Selecting a power distribution mode: if being a fixed distribution coefficient, generating a distribution coefficient matrix W, and establishing a hybrid system model for feeder power coordinated control.

S5: If being a rolling distribution coefficient, an exchange power P(t) of the control region at time t being obtained, generating a distribution coefficient matrix W(t), and establishing the hybrid system model of the said feeder power coordinated control.

S6: Confirming a control objective function min J.

S7: Converting it into a MIQP problem and solving thereof, then obtaining a full period control quantity.

S8: Selecting a first control quantity P of the optimized control sequence.

S9: Sending the control quantity P to the control device.

S10: Judging whether the current time is end time, Time=end?, if so, it ends.

S11: If not, performing an optimal control on a subsequent time period, Time=t+$\Delta$t, recalculating the feeder exchange power deviation variation $\Delta P(t)$ in the control time period, until the end time, Time=end?, is met.

Specifically, the feeder exchange power deviation variation $\Delta P(t)$ during the control period includes, for a power fluctuation of the feeder f at time t+$\Delta$t, $\Delta$t being a time interval, resulting in a deviation $\Delta P_f(t+\Delta t)$ between an exchange power value $P_f^{real}(t+\Delta t)$ and an optimal value $P_f^{opt}(t+\Delta t)$ of the feeder, wherein a feeder exchange power value $P_f^{real}(t+\Delta t)$ is obtained by the time value at a collection point t+$\Delta$t of a metering device installed at the feeder outlet, wherein the optimal value is obtained by a master station optimization, and relative to the state at time t, the feeder exchange power deviation variation in the control time period is $\Delta P(t)=\Delta P_f(t+\Delta t)-\Delta P_f(t)$, wherein the power change of $\Delta P(t)$ occurs on the feeder in the time interval of $\Delta$t.

Preferably, taking the control region as a control object in the power distribution, and eliminating the variation of the feeder exchange power deviation during the control period; all controllable distributed power sources between the branch defining switches on the feeder or between the branch defining switches and the end of the line forming a control region; a distribution coefficient matrix W being a constant matrix, as follows, $$W = [K_1, K_2 \cdots K_m \cdots K_i]$$

$$\begin{bmatrix} -1 & -1 & \cdots & -1 \\ 1 & 1 & \cdots & 1 \\ -\Delta P(t) & -\Delta P(t) & \cdots & 0 \\ \Delta P(t) & 0 & \cdots & \Delta P(t) \\ 0_n & & & \\ 0_n & & & \end{bmatrix} \delta(t) \le \begin{bmatrix} 0 & 0 & \cdots & 0 \\ 0 & 0 & \cdots & 0 \\ 0 & 0 & \cdots & 0 \\ 0 & 0 & \cdots & 0 \\ & & -I_n & \\ & & I_n & \end{bmatrix} x(t) + \begin{bmatrix} -1 \\ 1 \\ 0 \\ 0 \\ P_{max} \\ -P_{min} \end{bmatrix}$$

$K_1, K_2 \ldots K_m \ldots K_i$ represent vectors, where $K_m$ represents a distributed power in the control region according to $m^{th}$ coefficient combination, which is number of possible combinations, and only be one combination at any time; i is calculated by $i=1+m^n+j^n$, where n is the number of control regions included in the feeder; j is the number of possible values included in the distribution coefficient of each control region; $0_n$ represents an n-dimensional order zero matrix; $I_n$ represents an n-dimensional unit matrix; $P_{max}$ represents a maximum adjustable power of the distributed power in the control region; $P_{min}$ represents a minimum adjustable power of the distributed power in the control region; and $\delta(t)$ is a logic vector, $\delta(t)=[\delta_1(t), \delta_2(t) \ldots \delta_m(t) \ldots \delta_i(t)]'$, satisfying $\delta_m(t) \in \{0,1\}$, $m \in [1, 2, 3 \ldots i]$, where definitions of m and i are the same as the foregoing definition, and at any time, there is only one way to distribute power in the control region, so only one element in $\delta(t)$ takes 1, to satisfy the inequality constraint $$\begin{cases} \overbrace{[1, 1, 1 \ldots 1]}^{1 \times i} \times \delta(t) \ge 1 \\ \overbrace{[1, 1, 1 \ldots 1]}^{1 \times i} \times \delta(t) \le 1, \end{cases}$$

wherein the definition of i is the same as before, x(t) is a power distribution coefficient to be solved.

Further, the $m^{th}$ coefficient combination distributing a power $K_m$; within any time t, when the region distributing power according to the $m^{th}$ coefficient combination $K_m$, the corresponding logical variable being set to 1, thus $\delta_m(t)=1 \Leftrightarrow K(t)=K_m$, wherein $\Leftrightarrow$ is an equivalent symbol; K(t) represents the distribution coefficient vector within any time t, such that $K_n(t)$ combinations of the distribution coefficients of the n control regions is $K(t)=[K_1(t), K_2(t) \ldots K_n(t)]'$ (Or for control region n, having $K_n(t) \in K=\{K_{n1}^0, K_{n1}^+, K_{n2}^+ \ldots K_{nm}^+, K_{n1}^-, K_{n2}^- \ldots K_{nj}^-\}$, wherein j is the same as the preceding definition; $K_{n1}^0$, represents a first scenario that a first distribution coefficient of the control region n is zero, meaning that the region does not participate in adjustment; $K_{n1}^+$ represents a second scenario that the first distribution coefficient of region n is used to balance $\Delta P(t) \ge 0$, and $K_{n1}^-$ represents a third scenario that the first distribution coefficient of region n is used to balance $\Delta P(t) \le 0$; when the distribution coefficient vector K(t) comprising all of the three scenarios, all the control regions associated therewith do not participate in power regulation, in which case the distribution coefficient vector is recorded as $K_0(t)$ if $\Delta P(t) \ge 0$ occurs on the feeder at time t, all the control regions increase the power of the output to the feeder, and the distribution coefficient vector is recorded as $K^+(t)$; if $\Delta P(t) \le 0$ occurs on the feeder at time t, all the control regions reduce the power input into the feeder, and at this time, and the distribution coefficient vector is recorded as $K^-(t)$.

Furthermore, dividing the logical vector $\delta(t)$ into three parts: $\delta(t)[\delta^0(t), \delta^+(t), \delta^-(t)]'$, corresponding to the $K^0(t)$, $K^+(t)$ and $K^-$ (I), and satisfying the following distribution coefficient selection rules, $$\Delta P(t) \cdot [\delta^0(t) + \sum \delta^+(t)] \ge 0 \Leftrightarrow \Delta P(t) \cdot [1, \overbrace{1,1,1\cdots 1}^{+}, \overbrace{0,0,0 \cdots 0}^{-}] \cdot \delta(t) \ge 0$$

$$\Delta P(t) \cdot [\delta^0(t) + \sum \delta^-(t)] \le 0 \Leftrightarrow \Delta P(t) \cdot [1, \overbrace{0,0,0 \cdots 0}^{+}, \overbrace{1,1,1 \cdots 1}^{-}] \cdot \delta(t) \le 0$$

When $\Delta P(t)>0$, each of the control regions can only select the distribution coefficient in the $K^+(t)$ at the same time; when $\Delta P(t)<0$, each of the control regions can only select the distribution coefficient in the $K^-(t)$ at the same time; when $\Delta P(t)=0$, $K^0(t)$ is selected, + represents a corresponding section in item $\delta^+(t)$ to that in $\delta(t)$; and − represents a corresponding section in item $\delta^-(t)$ to that in $\delta(t)$;

The control region exchange power P(t) being an n-dimensional vector composed of the control region exchange powers of n control regions, satisfying $P(t)=[P_1(t), P_2(t) \ldots P_n(t)]'$, where $P_1(t)$ is an exchange power value of the control region 1;

The distribution coefficient matrix being W(t), $W(t)=[K_1', K_2' \ldots K_m' \ldots K_i']$;

The $m^{th}$ coefficient combination distributed power $K_m'$ is satisfied, at any time t, when the control region distributes power according to the $m^{th}$ coefficient combination $K_m'$, the distribution coefficient vector $K'(t)=K_m'$;

When the distribution coefficient vector K'(t) comprising the three scenarios, all the control regions do not participate in power regulation, in which case the distribution coefficient vector is recorded as $K^0(t)$;

When $\Delta P(t) \ge 0$ occurs on the feeder at time t, all the control regions increase power output to the feeder, and the distribution coefficient vector is recorded as $K^+(t)$;

When $\Delta P(t) \le 0$ occurs on the feeder at time t, all the control regions reduce the power input into the feeder, and the distribution coefficient vector is recorded as $K^-(t)$;

$$K^{+,'}(t) = \frac{1}{\sum_{i=1}^{n} P_{i-max} - \sum_{i=1}^{n} P_i(t)} \cdot [P_{1-max} - P_1(t), P_{2-max} - P_2(t) \cdots P_{n-max} - P_n(t)]$$

$$K^{-,'}(t) = \frac{1}{\sum_{i=1}^{n} P_i(t)} \cdot [P_1(t), P_2(t) \cdots P_n(t)]$$

$P_{i-max}$ represents the upper limit of power adjustment for the $i^{th}$ control region.

Preferably, the hybrid system model of the feeder power coordinated control includes, the hybrid system model for feeder power coordinated control includes, constructing an FSM model for an active distribution network feeder power control, and based on the FSM model, constructing an MLD model for an active distribution network feeder power coordinated control represented by a quintuple as follows:

$$A=\{Q,F,G,E,I\}$$

Q represents a limited set of states of the modeling object, which is the discrete state feature of the modeling object; F is a set of physical motion principles of the modeling object at each state, which describes the continuous dynamic characteristics of the modeling object, and when expressed by differential equations, a combination of Q and F being expressed as follows:

$$P(t+\Delta t)=I_n P(t)+K(t)\Delta P(t)$$

G is a set of trigger events, which is composed of a series of events that cause the state transition or stagnation of the modeling object; E is a set of transfer functions, representing mapping rules for variables and states to be satisfied when a state transition occurs for the modeling object, where the state transition depends on the selection of the distribution coefficient vector K(t) by the control region; I represents the initial state set, which sets the initial state of the modeling object.

Adopting a progressive distribution mode to the hybrid system model by accumulating variation ΔP(t) of deviation at each time to reflect the progressive relationship between two of the time points in the control region.

The MLD model includes if the power distribution mode is a fixed distribution coefficient, the distributed power is expressed as follows:

$$P(t+\Delta t)=I_n \cdot P(t)+W \cdot \delta(t) \cdot \Delta P(t)$$

If the power distribution mode is a rolling distribution coefficient, the distributed power is expressed as follows:

$$P(t+\Delta t)=I_n \cdot P(t)+W(t) \cdot \delta(t) \cdot \Delta P(t);$$

The control objective function comprises reducing a feeder power deviation, reducing cost of power regulation in the control region, and maintaining the region power exchange target;

The MIQP problem comprises variations of the power of the n control regions on the active distribution network feeder according to the feeder exchange power, adjusting the exchange power in the power region according to the FSM model of the active distribution network feeder power control, when the MLD model constraint condition of the active distribution network feeder power coordinated control is satisfied, all the power distribution coefficients in the control period T are calculated to optimize the control objective function; a first control variable P of the optimized control sequence representing the power exchange of each control region calculated according to the first power distribution coefficient vector in the control period T; a control device is arranged in the control region, and the distributed power supply in the control region is controlled according to the exchange power of the control region; Δt is a desired optimization step size.

Preferably, this embodiment also needs to explain that the present invention comprehensively considers the interaction of physical processes and information processes. The state switching scenario is added to the feeder power coordinated control of the active distribution network, and the hybrid system model of the feeder power coordinated control is constructed according to the two modes of fixed power distribution and rolling power distribution. The mixed system model is used as the prediction of the controlled object model. The rolling optimization method is adopted to implement model predictive control. Based on the model and considering the cost coefficient of the control region to bear the feeder power error and maintaining the global optimization goal, a model predictive control based active distribution network cyber-physical fusion control method based on a hybrid system model is proposed. Through the coordinated control of the active output of distributed power sources, the management of the feeder power in the network and the power of the autonomous control region is realized, and the control accuracy is improved.

Example 2

Figure 2:
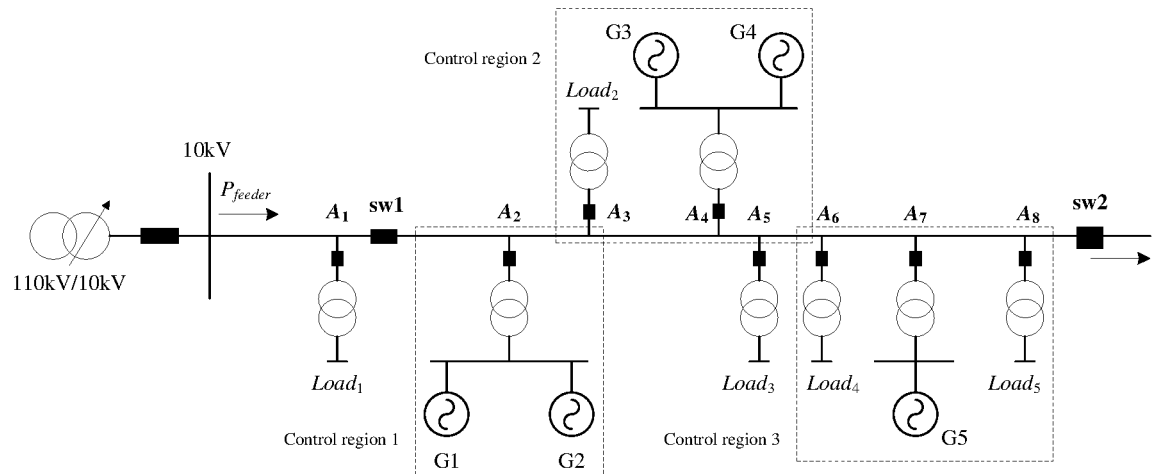
FIG. 2 is a schematic diagram of an active distribution network system of the active distribution network physics-information fusion control method for a hybrid system model according to an embodiment of the present invention.

Referring to FIGS. 2-6, the second embodiment of the present invention is different from the first embodiment in that an experimental verification of an active distribution network physics-information fusion control method for a hybrid system model is provided, which includes:

Referring to FIG. 2, this embodiment performs a test of an active distribution network physics-information fusion control method for a hybrid system model considering distribution mode switching. The calculation example is as follows and the control scenario includes: Feeder power fluctuates due to changes in DG1 output power of distributed power supply and feeder equivalent loads Load1, Load2, Load4. In order to ensure that the feeder power fluctuations can be suppressed by the distributed power sources controlled by the feeder and maintain the feeder exchange power operation at the target value, the following will use the PI control based on the feeder control error and the active distribution network information physical fusion control method for comparison and verification.

Set the distribution coefficient of feeder power error K=[0.3152, 0.1857, 0.5], set the PI control parameters kp=0.38, ki=0.88 of this embodiment, and the simulation time is 300 seconds.

Figure 3:
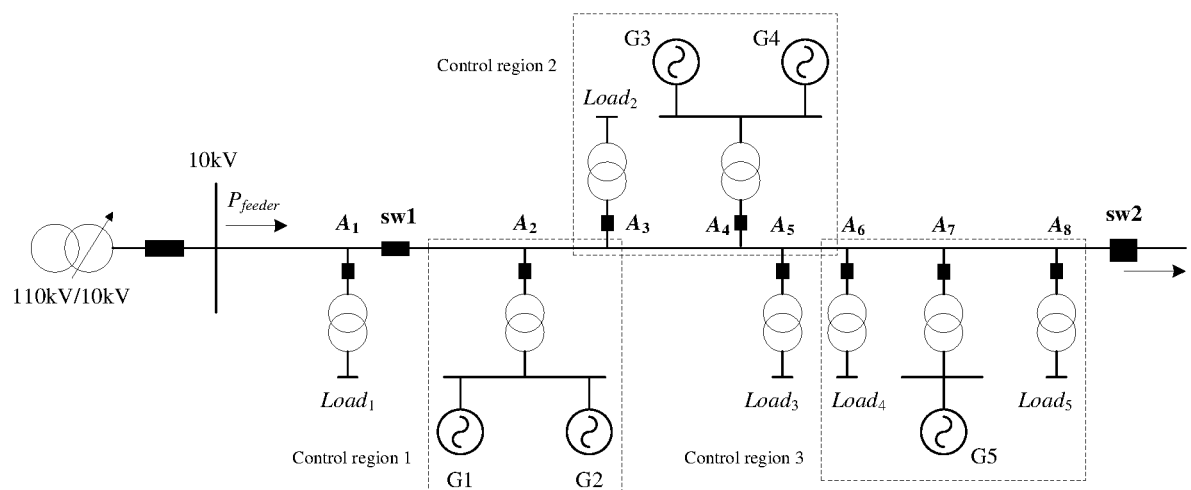
FIG. 3 is a schematic diagram of the exchange power of each control region using PI control in the active distribution network physics-information fusion control method for a hybrid system model according to an embodiment of the present invention.
Figure 4:
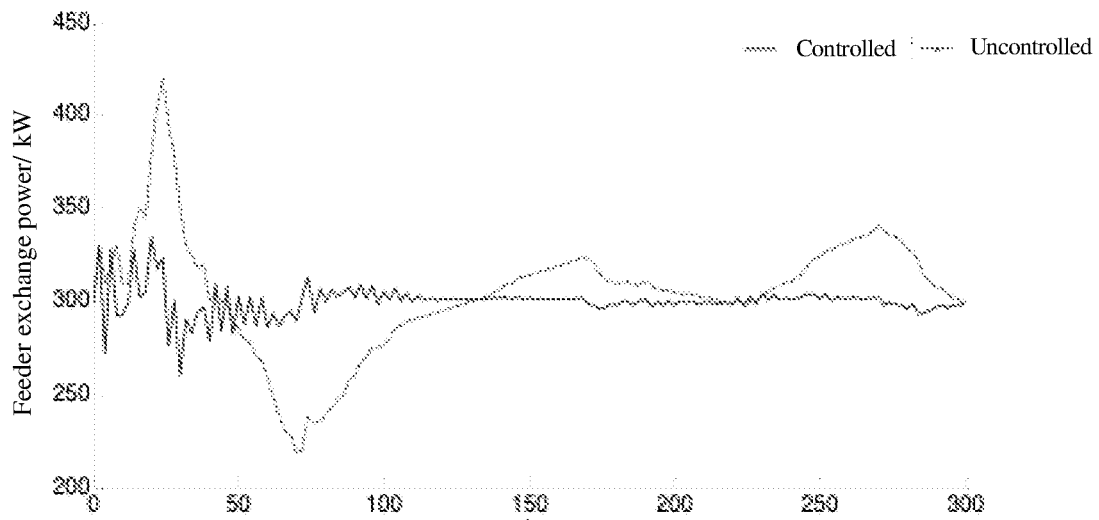
FIG. 4 is a schematic diagram of feeder exchange power using PI control in the active distribution network physics-information fusion control method for a hybrid system model according to an embodiment of the present invention.

Referring to FIGS. 3 and 4, after control, the feeder exchange power has a much smoother fluctuation range than when it is not controlled, but the feeder exchange power still has certain fluctuations. This is because PI control collects the power error at the current time and compares it with the previous time, and adjusts it through the error accumulation. Therefore, this control method has hysteresis.

According to this model of the hybrid system, the active distribution network physics-information fusion control method for a hybrid system model is verified. The model predictive control step Δt=2s, the control period T=5Δt=10s, and the simulation duration is 300s.

Figure 5:
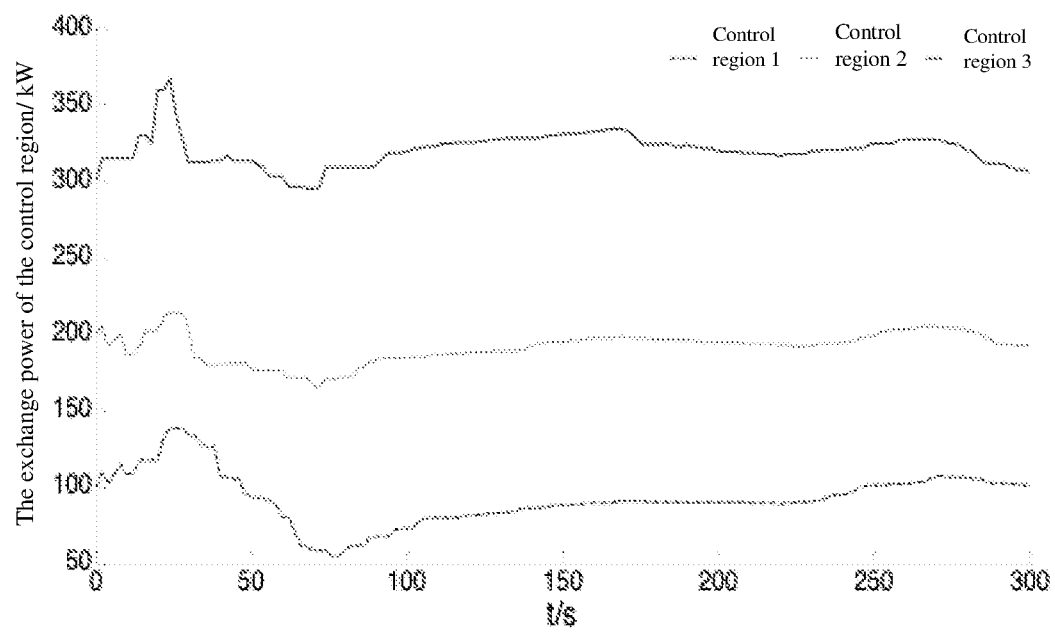
FIG. 5 is a schematic diagram of the exchange power of each control region of the model predictive control of the active distribution network physics-information fusion control method for a hybrid system model according to an embodiment of the present invention.
Figure 6:
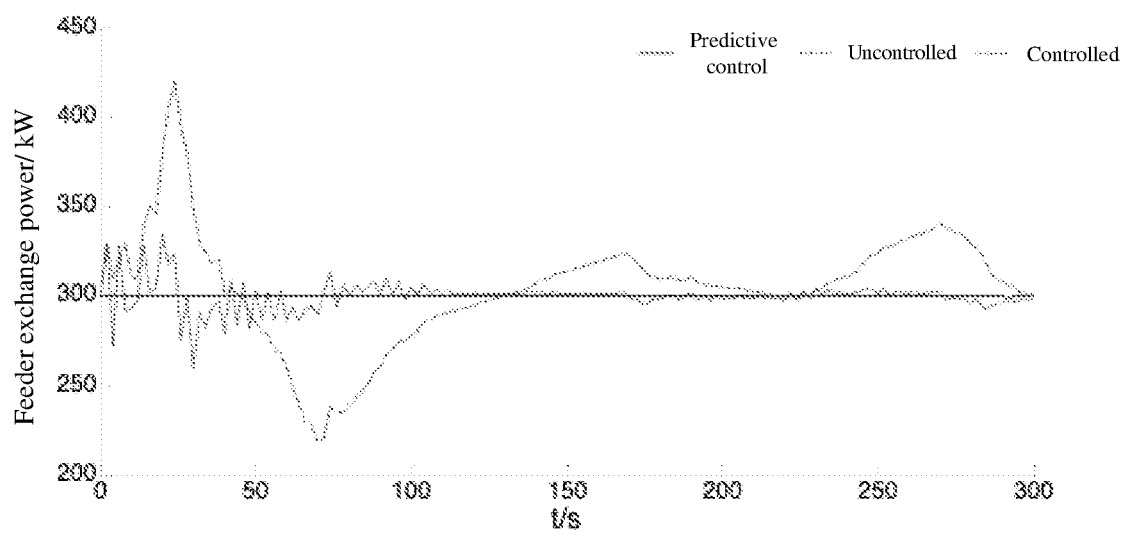
FIG. 6 is a schematic diagram of the feeder exchange power comparison of different control methods of the active distribution network physics-information fusion control method for a hybrid system model according to an embodiment of the present invention.

Referring to FIGS. 5-6, if the distribution coefficient is fixed, the control effect is shown in FIGS. 5-6. Since the feeder intermittent power output and feeder load fluctuations are predicted during the control process. At the beginning of each control period, power predictions with five control steps can be obtained for this period. At each of these five steps, the power distribution selection for the next moment will be based on to the change of the feeder exchange power deviation ΔP(t) at the next moment and the current moment. If the predicted value of intermittent power output and load fluctuation is accurate, the deviation of feeder exchange power can always be fully distributed by each control region.

If it is a rolling distribution coefficient, at the beginning of each control period, the distribution coefficient of this round of control will be calculated based on the exchange power situation of the control region at this time, so that the control result of this round will have an impact on the subsequent control.

In summary, model predictive control based on hybrid systems has advantages over PI control: First, multiple optional feeder power distribution methods are more reasonable than a fixed and single distribution ratio; Secondly, in terms of effect, rolling optimization improves economic indicators; Finally, in terms of demand, predictive control eliminates the hysteresis of PI control, enabling the active distribution network to reduce feeder exchange power and improve the goal of internal power consumption.

It should be noted that the above embodiments are only used to illustrate the technical solutions of the present invention rather than limiting, although the present invention has been described in detail with reference to the preferred embodiments. Those of ordinary skill in the art should understand that modifications or equivalent replacements can be made to the technical solutions of the present invention without departing from the spirit and scope of the technical solutions of the present invention, which should all be covered by the scope of the claims of the present invention.

What is claimed is:

1. An active distribution network physics-information fusion control method for a hybrid system model, comprising,
   an initialization time being a starting time Time=t, predicting power output and load of a feeder intermittent distributed power supply within a control time period T;
   calculating a feeder exchange power deviation variation $\Delta P(t)$ during the control time period, selecting a power distribution mode:
      if being a fixed distribution coefficient, generating a distribution coefficient matrix W, and establishing a hybrid system model for feeder power coordinated control;
      if being a rolling distribution coefficient, an exchange power P(t) of the control region at time t being obtained, generating a distribution coefficient matrix W(t), and establishing the hybrid system model of the said feeder power coordinated control;
   confirming a control objective function min J, converting it into a MIQP problem and solving thereof, then obtaining a full period control quantity;
   selecting a first control quantity P of the optimized control sequence, sending the first control quantity P to the control device, and judging whether the current time is end time, Time=end?, if so, it ends;
   if not, performing an optimal control on a subsequent time period, Time=t+$\Delta$t, recalculating the feeder exchange power deviation variation $\Delta P(t)$ in the control time period, until the end time, Time=end?, is met.

2. The active distribution network physics-information fusion control method for a hybrid system model according to claim 1, wherein the feeder exchange power deviation variation $\Delta P(t)$ during the control period comprises:
   for a power fluctuation of the feeder f at time t+$\Delta$t, $\Delta_f$, being a time interval, resulting in a deviation $\Delta p_f(t+\Delta t)$ between an exchange power value $P_f^{real}(t+\Delta t)$ and an optimal value $P_f^{real}(t+\Delta t)$ of the feeder, wherein a feeder exchange power value $P_f^{real}(t+\Delta t)$ is obtained by the time value at a collection point t+$\Delta$t of a metering device installed at the feeder outlet, wherein the optimal value is obtained by a master station optimization, and relative to the state at time t, the feeder exchange power deviation variation in the control time period is $\Delta P(t) = \Delta p_f(t+\Delta t) - \Delta P_f(t)$, wherein the power change of $\Delta P(t)$ occurs on the feeder in the time interval of $\Delta t$.

3. The active distribution network physics-information fusion control method for a hybrid system model according to claim 1, further comprising,
taking the control region as a control object in the power distribution, and eliminating the variation of the feeder exchange power deviation during the control period;
all controllable distributed power sources between the branch defining switches on the feeder or between the branch defining switches and the end of the line forming a control region;
a distribution coefficient matrix W being a constant matrix, as follows, $$W = [K_1, K_2 \cdots K_m \cdots K_i]$$

$$\begin{bmatrix} -1 & -1 & \cdots & -1 \\ 1 & 1 & \cdots & 1 \\ -\Delta P(t) & -\Delta P(t) & \cdots & 0 \\ \Delta P(t) & 0 & \cdots & \Delta P(t) \\ 0_n & & & \\ 0_n & & & \end{bmatrix} \delta(t) \leq \begin{bmatrix} 0 & 0 & \cdots & 0 \\ 0 & 0 & \cdots & 0 \\ 0 & 0 & \cdots & 0 \\ 0 & 0 & \cdots & 0 \\ & & -I_n & \\ & & I_n & \end{bmatrix} x(t) + \begin{bmatrix} -1 \\ 1 \\ 0 \\ 0 \\ P_{max} \\ -P_{min} \end{bmatrix}$$

wherein $K_1, K_2 \ldots K_m \ldots K_i$ represent vectors, where $K_m$ represents a distributed power in the control region according to $m^{th}$ coefficient combination, which is number of possible combinations, and only be one combination at any time; i is calculated by $i=1+m^n+j^n$, where n is the number of control regions included in the feeder; j is the number of possible values included in the distribution coefficient of each control region; $0_n$ represents an n-dimensional order zero matrix; $I_n$ represents an n-dimensional unit matrix; $P_{max}$ represents a maximum adjustable power of the distributed power in the control region; $P_{min}$ represents a minimum adjustable power of the distributed power in the control region; and $\delta(t)$ is a logic vector, $\delta(t)=[\delta_1(t), \delta_2(t) \ldots \delta_m(t) \ldots \delta_i(t)]'$, satisfying $\delta_m(t) \in \{0,1\}$, $m \in [1, 2, 3 \ldots i]$, where definitions of m and i are the same as the foregoing definition, and at any time, there is only one way to distribute power in the control region, so only one element in $\delta(t)$ takes 1, to satisfy the inequality constraint $$\begin{cases} \overline{[1,1,1\ldots 1]}^{1\times i} \times \delta(t) \geq 1 \\ \overline{[1,1,1\ldots 1]}^{1\times i} \times \delta(t) \leq 1, \end{cases}$$

wherein the definition of i is the same as before, x(t) is a power distribution coefficient to be solved.

4. The active distribution network physics-information fusion control method for a hybrid system model according to claim 3, further comprising:
   the $m^{th}$ coefficient combination distributing a power $K_m$; within any time t, when the region distributing power according to the $m^{th}$ coefficient combination $K_m$, the corresponding logical variable being set to 1, thus $\delta_m(t)=1 \Leftrightarrow K(t)=K_m$, wherein $\Leftrightarrow$ is an equivalent symbol;
   K(t) represents the distribution coefficient vector within any time t, such that $K_n(t)$ combinations of the distribution coefficients of the n control regions is $K(t)=[K_1(t), K_2(t) \ldots K_n(t)]'$;
   for control region n, having $K_n(t) \in K=\{K_{n1}^0, K_{n1}^+, K_{n2}^+ \ldots K_{nm}^+, K_{n1}^- K_{n2}^- \ldots K_{nj}^-\}$, wherein j is the same as the preceding definition; $K_{n1}^0$, represents a first scenario that a first distribution coefficient of the control region n is zero, meaning that the region does not participate in adjustment; $K_{n1}^+$ represents a second scenario that the first distribution coefficient of region n is used to balance $\Delta P(t) \geq 0$; and $K_{n1}^-$ represents a third scenario that the first distribution coefficient of region n is used to balance $\Delta P(t) \leq 0$;

when the distribution coefficient vector K(t) comprising all of the three scenarios, all the control regions associated therewith do not participate in power regulation, in which case the distribution coefficient vector is recorded as $\Delta P(t) \geq 0$;

if $\Delta P(t) \geq 0$ occurs on the feeder at time t, all the control regions increase the power of the output to the feeder, and the distribution coefficient vector is recorded as $K^+(t)$;

if $\Delta P(t) \leq 0$ occurs on the feeder at time t, all the control regions reduce the power input into the feeder, and at this time, and the distribution coefficient vector is recorded as $K^-(t)$.

5. The active distribution network physics-information fusion control method for a hybrid system model according to claim 4, further comprising:

dividing the logical vector $\delta(t)$ into three parts: $\delta(t)=[\delta^0(t), \delta^+(t), \delta^-(t)]'$, corresponding to the $K^0(t)$, $K^+(t)$ and $K^-(t)$, and satisfying the following distribution coefficient selection rules, $$\Delta P(t) \cdot \left[\delta^0(t) + \sum \delta^+(t)\right] \geq 0 \Leftrightarrow \Delta P(t) \cdot [1, \overbrace{1,1,1\cdots 1}^{+}, \overbrace{0,0,0\cdots 0}^{-}] \cdot \delta(t) \geq 0$$

$$\Delta P(t) \cdot \left[\delta^0(t) + \sum \delta^-(t)\right] \leq 0 \Leftrightarrow \Delta P(t) \cdot [1, \overbrace{0,0,0\cdots 0}^{+}, \overbrace{1,1,1\cdots 1}^{-}] \cdot \delta(t) \leq 0$$

when $\Delta P(t)>0$, each of the control regions can only select the distribution coefficient in the $K^+(t)$ at the same time;

when $\Delta P(t)<0$, each of the control regions can only select the distribution coefficient in the $K^-(t)$ at the same time;

when $\Delta P(t)=0$, $K^0(t)$ is selected, + represents a corresponding section in item $\delta^+(t)$ to that in $\delta(t)$; and − represents a corresponding section in item $\delta^-(t)$ to that in $\delta(t)$.

6. The active distribution network physics-information fusion control method for a hybrid system model according to claim 5, further comprising:

the control region exchange power P(t) being an n-dimensional vector composed of the control region exchange powers of n control regions, satisfying $P(t)=[P_1(t), P_2(t) \ldots P_n(t)]'$, where $P_1(t)$ is an exchange power value of the control region 1;

the distribution coefficient matrix being W(t), $W(t)=[K_1', K_2' \ldots K_m' \ldots K_i']$;

wherein the $m^{th}$ coefficient combination distributed power $K_m'$ is satisfied, at any time t, when the control region distributes power according to the $m^{th}$ coefficient combination $K_m'$, the distribution coefficient vector $K'(t)=K_m'$;

when the distribution coefficient vector K'(t) comprising the three scenarios, all the control regions do not participate in power regulation, in which case the distribution coefficient vector is recorded as $K^0(t)$;

when $\Delta P(t) \geq 0$ occurs on the feeder at time t, all the control regions increase power output to the feeder, and the distribution coefficient vector is recorded as $K^+(t)$;

when $\Delta P(t) \leq 0$ occurs on the feeder at time t, all the control regions reduce the power input into the feeder, and the distribution coefficient vector is recorded as $K^-(t)$;

$$K^{+\prime}(t) = \frac{1}{\sum_{i=1}^{n} P_{i-max} - \sum_{i=1}^{n} P_i(t)} \cdot [P_{1-max} - P_1(t), P_{2-max} - P_2(t) \cdots P_{n-max} - P_n(t)]$$

$$K^{-\prime}(t) = \frac{1}{\sum_{i=1}^{n} P_i(t)} \cdot [P_1(t), P_2(t) \cdots P_n(t)]$$

wherein $P_{i-max}$ represents an upper limit of power adjustment for the $i^{th}$ control region.

7. The active distribution network physics-information fusion control method for a hybrid system model according to claim 1, wherein the hybrid system model for feeder power coordinated control comprising, constructing an FSM model for an active distribution network feeder power control, and based on the FSM model, constructing an MLD model for an active distribution network feeder power coordinated control represented by a quintuple as follows:

$$A=\{Q,F,G,E,I\}$$

wherein Q represents a limited set of states of the modeling object, which is the discrete state feature of the modeling object; F is a set of physical motion principles of the modeling object at each state, which describes the continuous dynamic characteristics of the modeling object, and when expressed by differential equations, a combination of Q and F being is expressed as follows:

$$P(t+\Delta t)=I_n P(t)+K(t)\cdot \Delta P(t)$$

wherein G is a set of trigger events, which is composed of a series of events that cause the state transition or stagnation of the modeling object; E is a set of transfer functions, representing mapping rules for variables and states to be satisfied when a state transition occurs for the modeling object, where the state transition depends on the selection of the distribution coefficient vector K(t) by the control region; I represents the initial state set, which sets the initial state of the modeling object;

adopting a progressive distribution mode to the hybrid system model by accumulating variation $\Delta P(t)$ of deviation at each time to reflect the progressive relationship between two of the time points in the control region.

8. The active distribution network physics-information fusion control method for a hybrid system model according to claim 7, wherein the MLD model comprises, if the power distribution mode is a fixed distribution coefficient, the distributed power is expressed as follows:

$$P(t+\Delta t)=I_n \cdot P(t)+W\cdot \delta(t)\cdot \Delta P(t)$$

if the power distribution mode is a rolling distribution coefficient, the distributed power is expressed as follows:

$$P(t+\Delta t)=I_n \cdot P(t)+W(t)\cdot \delta(T)\cdot \Delta P(t).$$

9. The active distribution network physics-information fusion control method for a hybrid system model according to claim 1, wherein the control objective function comprises reducing a feeder power deviation, reducing cost of power regulation in the control region, and maintaining the region power exchange target;

wherein the MIQP problem comprises variations of the power of the n control regions on the active distribution network feeder according to the feeder exchange power, adjusting the exchange power in the power region according to the FSM model of the active distribution network feeder power control, when the MLD model constraint condition of the active distribution network feeder power coordinated control is satisfied, all the power distribution coefficients in the control period T are calculated to optimize the control objective function.

10. The active distribution network physics-information fusion control method for a hybrid system model according to claim 1, further comprising:

the first control variable P of the optimized control sequence representing a power exchange of each control region calculated according to a first power distribution coefficient vector in the control period T;

wherein a control device is arranged in the control region, and the distributed power supply in the control region is controlled according to the exchange power of the control region;

wherein $\Delta t$ is a desired optimization step size.

* * * * *